United States Patent [19]

Marcus et al.

[11] Patent Number: 5,736,734
[45] Date of Patent: Apr. 7, 1998

[54] LIQUID PLATEN FINGERPRINT IMAGE ENHANCEMENT

[75] Inventors: Daniel H. Marcus, New City; Hakan I. Pekcan, Brooklyn; William Chilcott, Ossining; Arthur Schlang, Coram, all of N.Y.

[73] Assignee: Fingermatrix, Inc., Dobbs Ferry, N.Y.

[21] Appl. No.: 696,009

[22] Filed: Aug. 12, 1996

[51] Int. Cl.⁶ .............. G02F 1/01; G06K 9/74; B42D 15/00
[52] U.S. Cl. .......... 250/225; 250/227.11; 356/71; 382/124; 283/70
[58] Field of Search .............. 250/225, 227.28, 250/227.29, 227.24, 227.11; 356/71; 382/124–127; 283/68, 69, 70, 78

[56] References Cited

U.S. PATENT DOCUMENTS

| | | | |
|---|---|---|---|
| 3,804,519 | 4/1974 | Outeru et al. | 356/71 |
| 4,785,171 | 11/1988 | Dowling, Jr. et al. | 250/227.28 |
| 4,975,969 | 12/1990 | Tal | 283/70 |

Primary Examiner—Stephone B. Allen
Attorney, Agent, or Firm—Kilgannon & Steidl

[57] ABSTRACT

A fingerprint enhancement system has a platen with a liquid contacting and finger-touching surface. Two collimated interrogating light beams lie below and are opposite sides of the finger-touching surface. The horizontal extensions of the light beams assume an angle of approximately forty-five degrees with the finger longitudinal axis. Side surfaces of the platen are oriented normal to the incident colliminated light beams prior to interrogation. The light beam modulated by the fingerprint passes to a reflecting mirror, imaging means and a scanner below the platen. A polarizing filter lies between the platen and reflecting mirror. A second polarizing filter lies above the platen. A contrast enhancement circuit increases the modulation of the scanned fingerprint signal and automatically adjusts the level of the modulated signal without saturation. Circuit filtering eliminates spurious input signals. Finger position sensing by a light emitting diode and photo transistor is also provided.

16 Claims, 8 Drawing Sheets

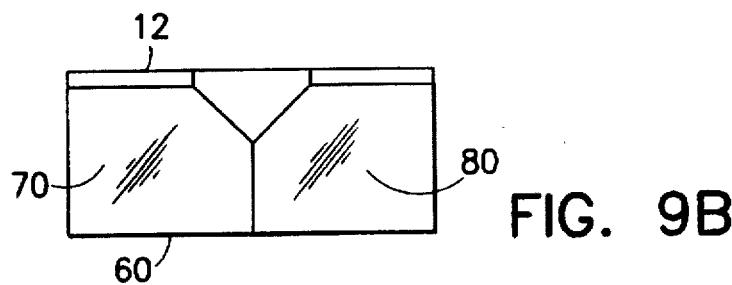
FIG. 9B
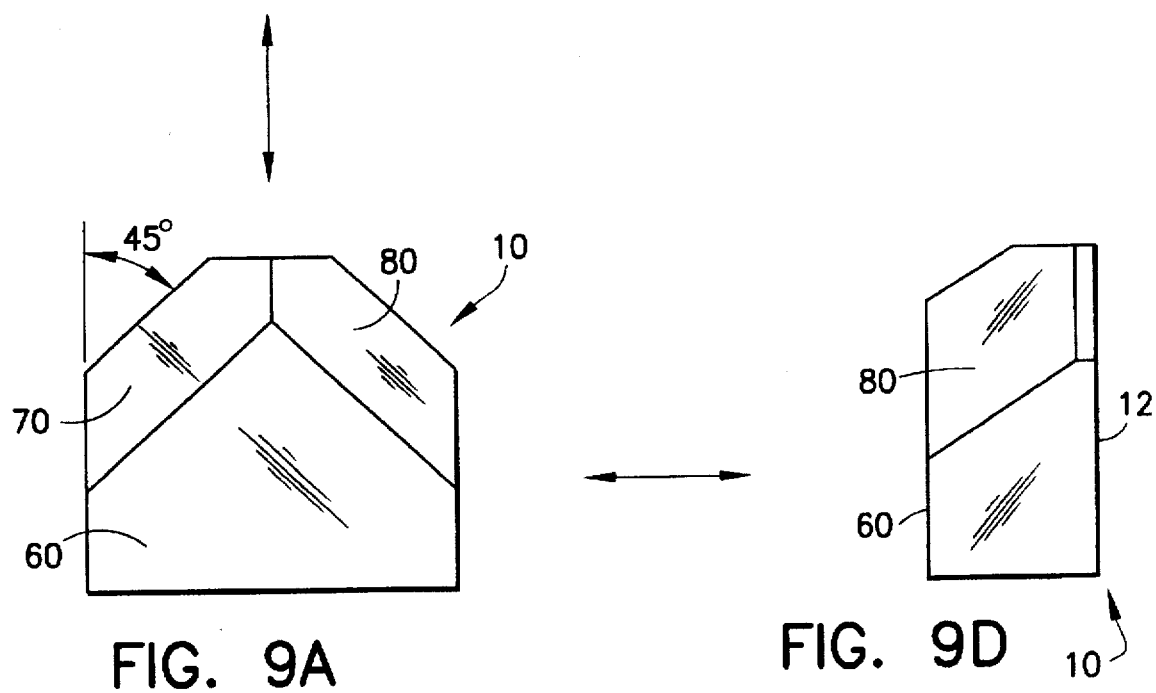
FIG. 9A
FIG. 9D
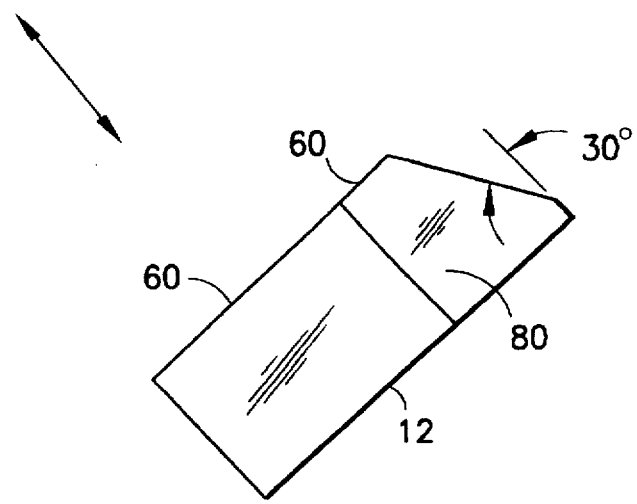
FIG. 9C

LIQUID PLATEN FINGERPRINT IMAGE ENHANCEMENT

FIELD OF THE INVENTION

The present invention relates to an optical system for creating fingerprint images.

BACKGROUND OF THE INVENTION

A number of techniques are known to optically create fingerprint images equivalent or superior to inked fingerprints. A particularly advantageous technique is set forth in U.S. Pat. Nos. 5,051,576 and 5,177,353, issued Sep. 24, 1991 and Jan. 5, 1993 respectively, the disclosures of which patents are generally incorporated herein by reference. These two patents disclose a system embodying a glass platen having a flat finger touching surface on which a layer of water and/or alcohol is present. A finger to be fingerprinted is immersed in the water and/or alcohol as the finger is pressed against the surface. Collimated interrogating light beams illuminate the finger, and the scattered reflections are passed through an imaging lens to a photo sensitive array.

Generally in optical fingerprinting, one wishes to achieve a fingerprint image with ridges, valleys, and the ridge and valley end points and bifurcations clearly defined to provide the unique identification points for each fingerprint. The ridge and valley end points and bifurcations are called minutia. Complicating identification of the minutia is the fact that ridges contain cracks and pores, thus rendering the identification (visual as well as automatic) of the end points and bifurcations more difficult.

The optical system disclosed in the two above-referenced patents, by virtue of the immersion of the finger into the liquid on the platen, clearly decreases the effects of the ridge cracks and pores. The liquid platen system is a significant improvement in the act of optical fingerprinting.

It has been surprisingly determined, however, that when using the liquid platen optical imaging system as aforementioned, the pores in the ridges of the finger surface tend to create bright spots on the bright ridge background (such pores appear as dark spots in a bright ridge background with prior art dry optical scanners, and as white "holes" on dark ridges in the well-known inked fingerprints). The pores in the ridges approximate small concave depressions, and act as concentrating light reflectors directing light towards the lens, rather than scattering the light as do ridges without pores. In the liquid platen system, if the bright spots created by the pores can be minimized, better fingerprint images can be obtained with even more accurate minutia.

It also has been observed in the liquid platen optical imaging system that a bright outline or "halo" appears around the fingerprint. This is probably attributable to the meniscus, formed as the liquid falls away from the finger to a thin film on the glass, acting as a reflector. Further, bright vertical lines appear in the liquid platen system where the platen joins its holder, a problem more of annoyance rather than degradation of the fingerprint images.

In addition, it is desirable in the liquid platen system to provide signals with a sufficiently high contrast between valley and ridge signals in order to easily identify the minutia. Simpler and less expensive electrical circuits to accomplish this result would be an advantage.

Still further, optical imaging systems can be adversely affected by overhead (non-interrogating) light directed downward on the platen surface being seen as a bright area surrounding the fingerprint image, thus interfering with the gain and level control circuitry extracting information about the fingerprint, degrading the image, and generally providing a distracting image. The readily apparent answer of providing a light shield above the platen to block the overhead light is not satisfactory since the shield also blocks the user's view of where to place the finger in relation to the platen.

The system according to the present invention is designed to solve or minimize the above-described complications, and to provide a superior form of liquid platen optical system.

SUMMARY OF THE INVENTION

The liquid platen system of the present invention employs two light sources below and on opposite sides of the finger providing collimated light to the horizontal platen finger touching surface, the horizonal extensions (projections) of the light beams each assuming substantially a forty-five degree angle with the longitudinal axis of the finger and a ninety degree angle with respect to each other. This serves to eliminate the third collimated light source pointing at the finger tip in a liquid platen system also having two light sources below and on opposite sides of the finger. A more inexpensive system is thus provided, which also requires less power and generates less heat. A symmetrical and more evenly illuminated system is also provided.

In the present invention, the light scattered and modulated from the ridges and valleys of the finger surface is passed through a polarizing filter, and then passed to a forty-five degree mirror which passes the visible light to a spherical imaging lens which focuses onto a photo sensitive scanning array, for example a CCD array. The polarizing filter has been discovered to significantly reduce the bright spots created by the pores in the ridges. The polarizing filter additionally significantly reduces the bright "halo" portions from the aforedescribed meniscus, and effectively eliminates the bright lines on the right and left edges where the platen is joined to the holder.

A further distinct advantage of using only the two light sources at the forty-five degree (horizontally extended) angles to the finger longitudinal axis is that a portion of all the light reflected from the pores is removed by the polarizing filter. In the aforesaid three light source system, the light reflected from the pores by the light from the third source pointing at the finger tip is not removed by the polarizing filter and thus the bright spots from the pores are not minimized. The two light sources angled as described have been found to provide sufficient illumination of the finger surface to extract the desired minutia. The two light sources also are each positioned to provide collimated light at a thirty degree angle to the platen finger touching surface, thereby providing optimal imaging with less shadowing effects.

The polarizing filter positioned as described in the present invention also presents the opportunity of dealing with the problem of overhead light above the finger, as previously described. A second polarizing filter can be positioned above the finger and rotated ninety degrees with respect to the alignment of the first polarizing filter positioned below the finger between the finger and the mirror/lens/photo diode array as described. The combination of the two filters rotated at ninety degrees with respect to each other effectively eliminates all overhead light reaching the photo diode array, and the particular problem of overhead light is eliminated.

Also provided in the present invention is a contrast enhancement circuit wherein the modulation of the ridge/ valley fingerprint signal is increased and its level automatically adjusted so that the resulting signal passed along to the analog/digital convertor is maximized without danger of saturation. The feedback detection system is optimized for the specific characteristics of the fingerprint ridge/valley signal. In this contrast enhancement circuit, the problem of preventing the peak detection circuit from responding to spurious signals is solved by electrical filtering means (as well as the previously-described optical filter).

Still further provided in the present invention is a combination of a focused light emitting diode and a lensed photo transistor to sense the presence of a finger on the platen, thereby avoiding prior art pressure sensitive switches requiring finger pressure on the platen and thus distortion of the finger surface so as to lose detail definition.

Other features and advantages of the present invention will be apparent from the following description, drawings and claims.

BRIEF DESCRIPTION OF THE DRAWINGS

FIGS. 9A, 9B, 9C and 9D respectively illustrate bottom, front, angled and side views of the platen, the views being taken with respect to each other along the arrows shown between the figures.

DESCRIPTION OF EMBODIMENT

Figure 1:
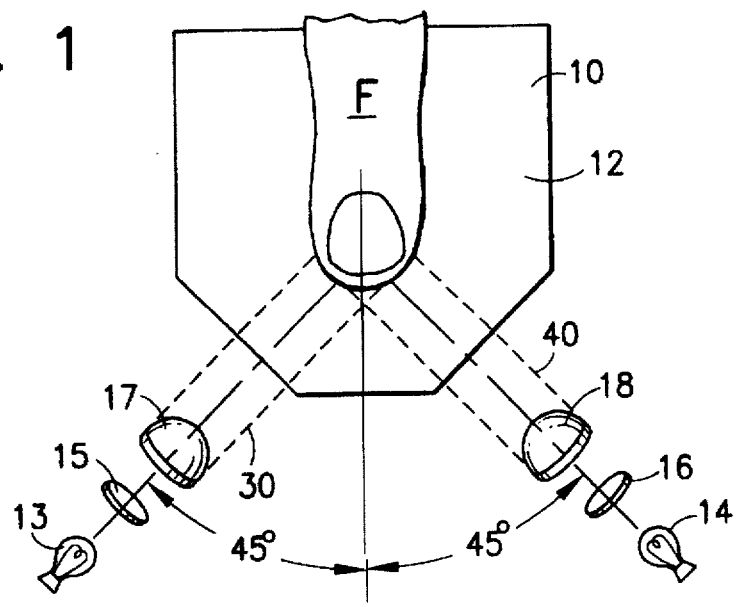
FIG. 1 is an overhead view of the optical system of the present invention, illustrating the two light sources and the finger on the top surface of the platen.
Figure 3:
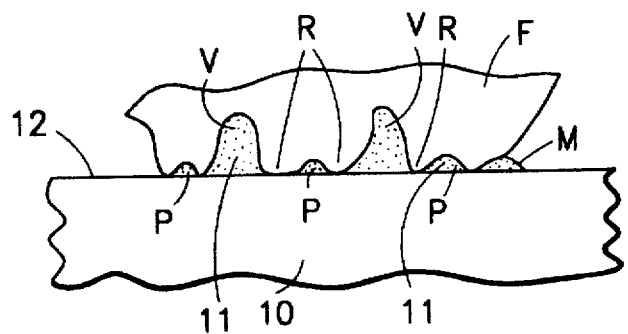
FIG. 3 is a magnified partial cross-sectional view of a finger surface on the horizontal surface of the platen.
Figure 2:
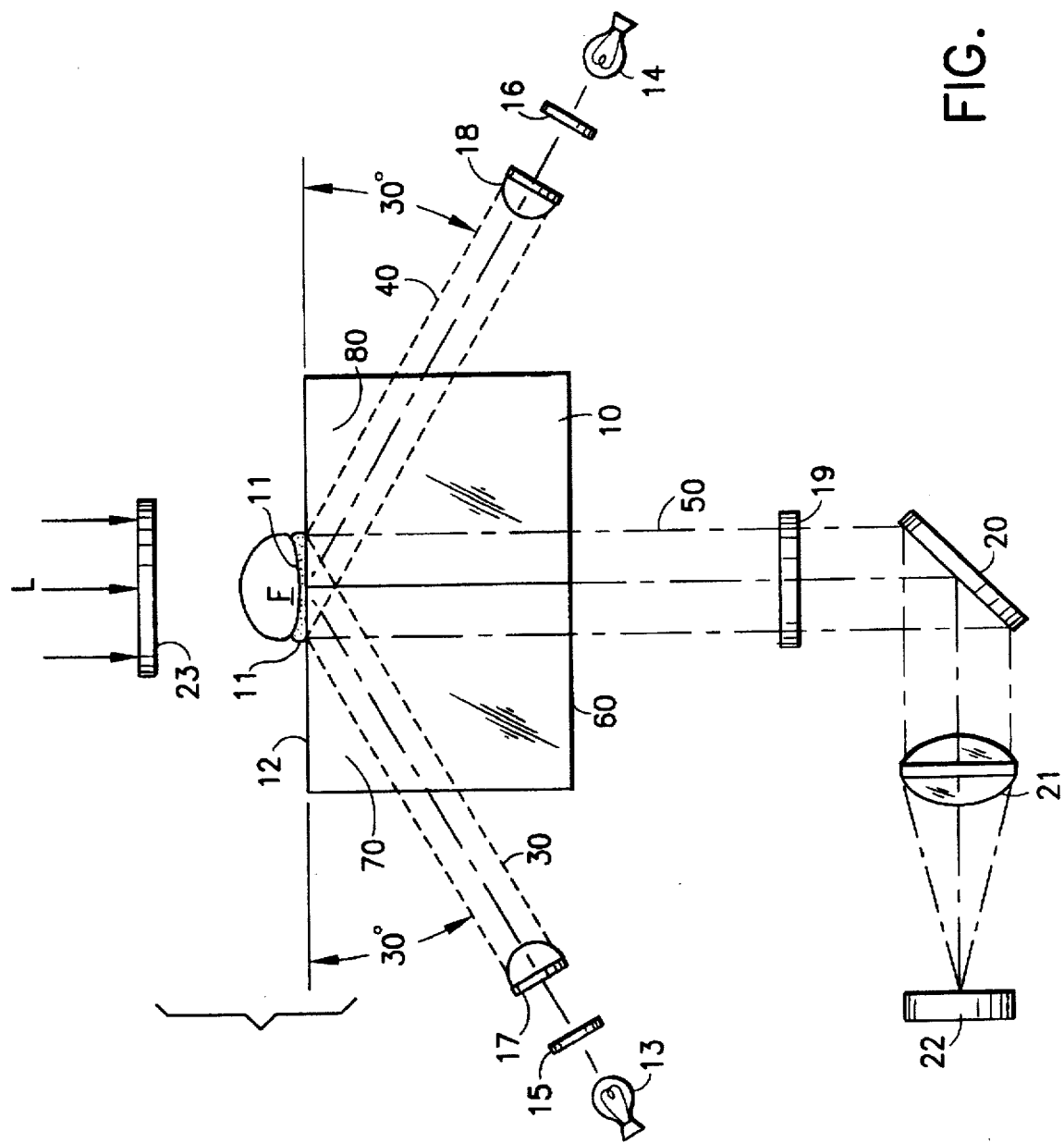
FIG. 2 is a front elevation of the optical system of the present invention.

Referring to FIGS. 1 and 2, glass or plastic platen 10 is shown, upon which a finger F is placed for scanning of a fingerprint. In the liquid platen system of the present invention, a layer 11 of a mixture of alcohol and water lies between the finger and platen horizontal top surface 12. Finger F is immersed in the liquid layer, which is thick enough to accordingly be in intimate contact with the ridges and at least a portion of the valleys of the fingerprint. The liquid accordingly fills in the cracks and pores of the ridges. Pores P, ridges R and valleys V are illustrated in the magnified partial cross-sectional view in FIG. 3 of the finger surface.

FIGS. 1 and 2 illustrate the two light sources 13 and 14, with diffuser elements 15, 16 and collimating lenses 17, 18 to provide collimated light beams 30 and 40 to flood the platen finger-touching surface 12 and interrogate the finger surface. Each light source is aligned in relation to the platen 10 such that the horizontal extension (projection) of its light beam into the horizontal plane of platen horizontal surface 12 forms a forty-five degree angle with the longitudinal axis of the finger F as shown in FIG. 1. The two light sources are positioned below and on opposite sides of the finger F as shown in FIG. 2. The two light sources provide sufficient illumination of the fingerprint surface, and the respective forty-five degree angle alignments provide the advantages described above. The light source pointing at the finger end can be eliminated, and the minimization of the brightness of the pores accordingly is enhanced. The interrogating beams are each incident at an angle to the finger-touching surface of the platen so that the finger-touching surface in combination with the liquid layer assures that the beams optimally illuminate the ridges and valleys of the fingerprint. It has been found that an angle of approximately 30° with the finger-touching surface, as shown in FIG. 2, provides the best results. Further referring to FIG. 9C, it will be appreciated that the light beams are normal to the first prism surfaces (70, 80) that the beams encounter.

The collimated light beams 30, 40 are modulated by their scattering off the valleys and ridges of the fingerprint surface, and the scattered light shown as 50 is passed by polarizing filter 19 to the forty-five degree angled mirror 20. Mirror 20 reflects the visible light to imaging lens 21, which focuses the light on the CCD scanning array 22. The CCD array may be a linear array perpendicular to the plane of FIG. 2, and the array together with the imaging lens 21 may be mounted on a slide table to effect the scan of the image, all as disclosed in U.S. Pat. No. 5,177,353. As previously discussed, polarizing filter 19 acts to substantially reduce the excessive bright light caused by pores P in the fingerprint surface, to result in a more reliable fingerprint image. Polarizing filter 19 also has been found to minimize the halo that surrounds the finger image, created by reflecting of the light sources from the liquid meniscus M shown in FIG. 3. It will be understood that the meniscus M is present on each side of the finger.

Referring to FIG. 2, overhead non-interrogating light designated L is schematically shown, which light ordinarily would have the effects described above. However, polarizing filter 23 is shown placed above finger F, which filter 23 is aligned at a ninety degree polarizing angle with respect to the polarizing angle of filter 19. The combination of the two filters 19 and 23, so aligned, effectively removes all of the overhead non-interrogating light from ever passing on to the CCD array. In other words, the presence of filter 19 allows the benefit of filter 23 to be obtained. Polarizing filter 23 must be placed above the platen, since if it were placed between platen 10 and polarizing filter 19 and aligned as described, the scattered light 50 would all be removed resulting in a black image.

FIGS. 9A, 9B, 9C and 9D respectively illustrate in detail the bottom, front, angled and side views of glass platen 10. FIG. 1 as previously noted is the top view of platen 10. Surfaces 12, 60, 70 and 80 are the optical surfaces of platen 10. Top surface 12 and bottom surface 60 are in parallel planes. The angular orientation of platen surfaces 70 and 80 are shown by the indicated forty-five degree angle shown in FIG. 9A and the indicated thirty degree angle shown in FIG. 9C. The forty-five degree angle of FIG. 9A also applies to surface 80, and the thirty degree angle of FIG. 9C also applies to surface 70. The light beams 30 and 40 shown in FIG. 2 respectively pass through platen surfaces 70 and 80 before interrogating the surface of finger F. It should be understood that the front view of FIG. 2 corresponds to FIG. 9B, with the detail of FIG. 9B being eliminated from FIG. 2 for purposes of clarity of illustration in FIG. 2.

Figure 4:
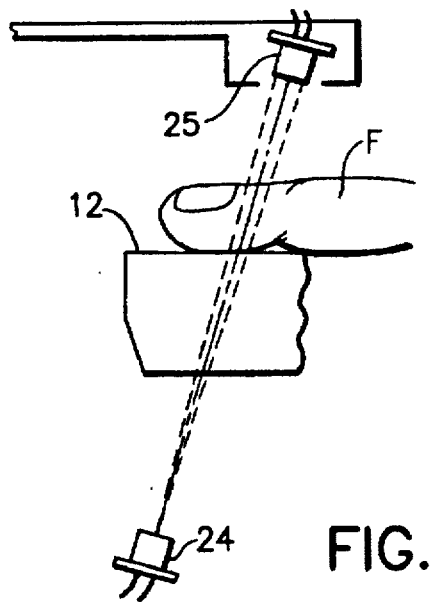
FIG. 4 illustrates a feature of the present invention wherein the finger in position on the platen can be detected.

Turning to FIG. 4, an advantageous sensing means is shown to sense when a finger F has been placed on the platen surface 12. Narrow beam light emitting diode 24 is positioned below the platen 10 and passes a narrow beam of light through the platen 10 to lensed phototransister 25. When finger F is properly placed on the platen surface 12, the finger interrupts the light beam. The phototransister circuit can then initiate the finger scanning, with a time delay to assure that the finger is at rest. Diode 24 is positioned so as not to affect the imaging.

Figure 5A:
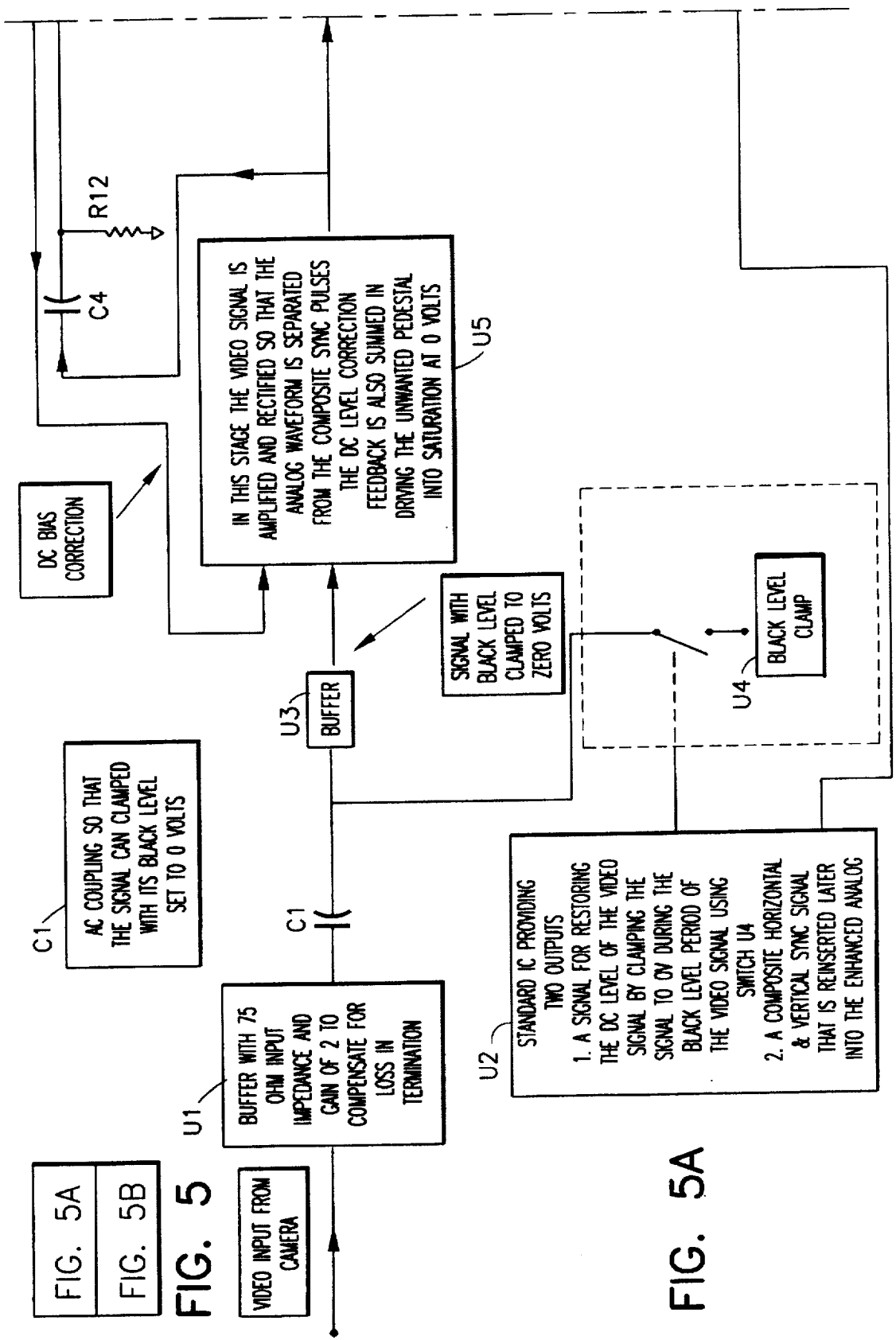
FIG. 5 is a block diagram (commenced on FIG. 5A and continued on FIG. 5B) of the contrast enhancement circuit of the present invention.
Figure 5B:
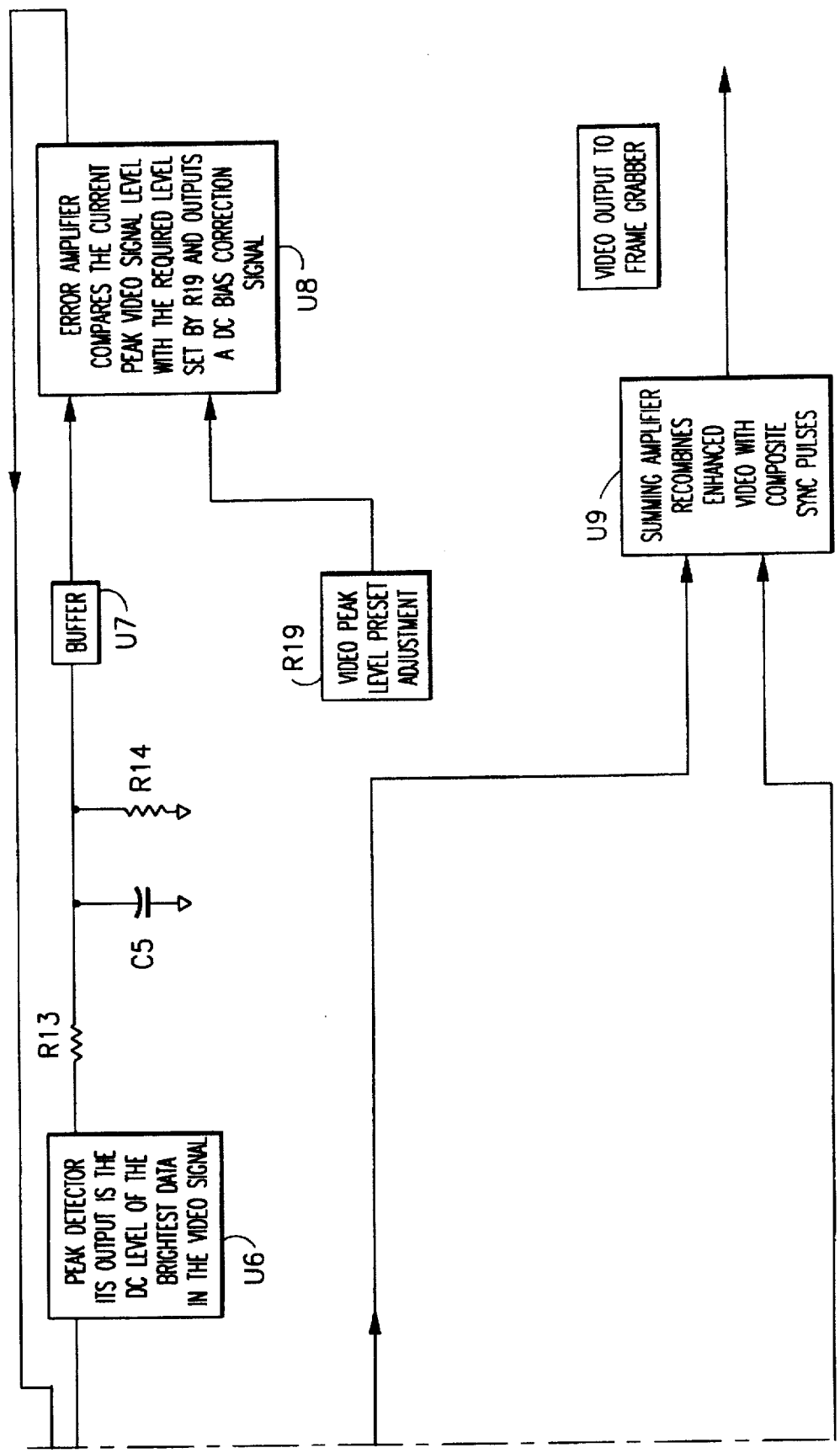
Figures 6, 6A:
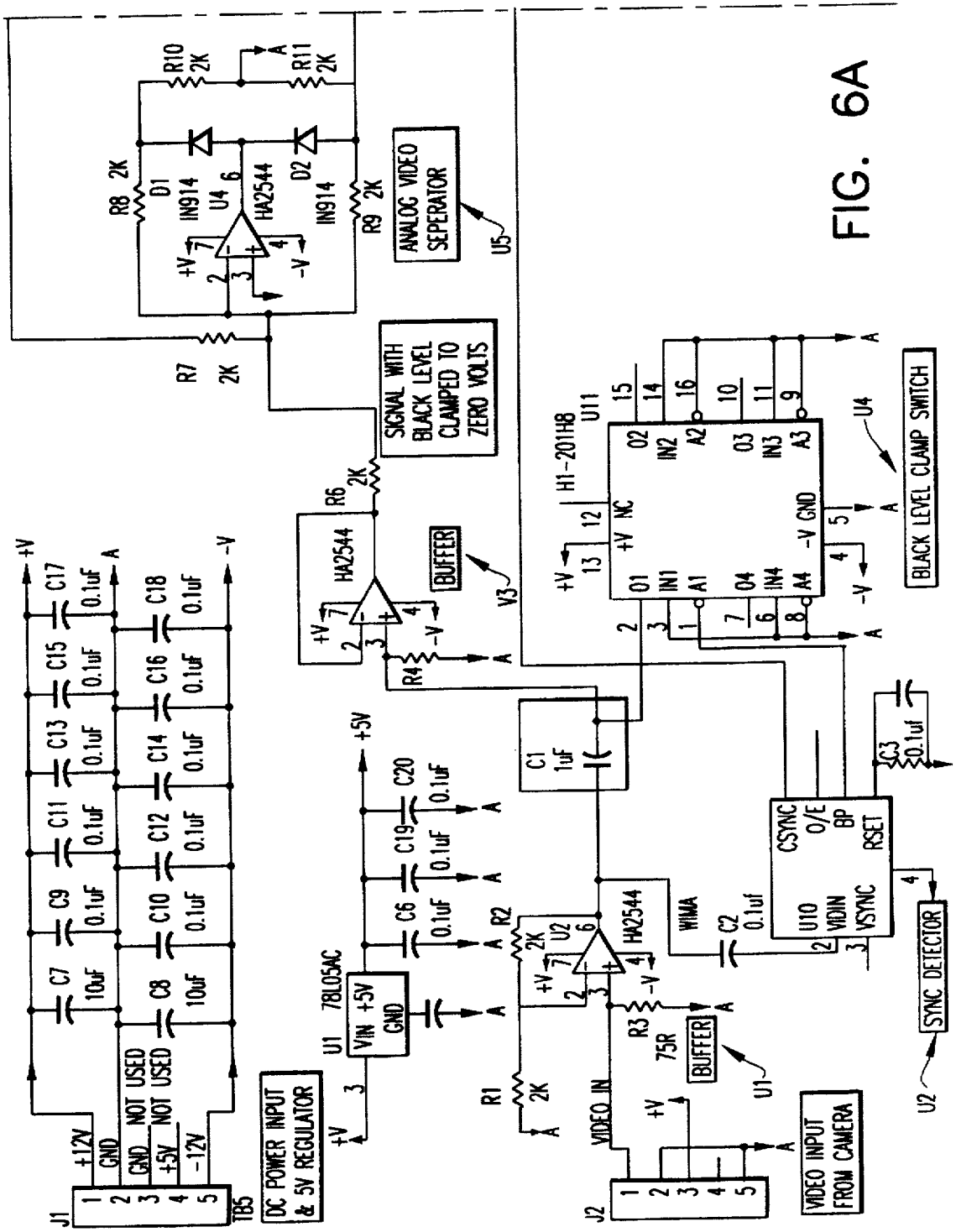
FIG. 6 is a schematic circuit diagram (commenced on FIG. 6A and continued on FIG. 6B) of the contrast enhancement circuit of the present invention.
Figure 6B:
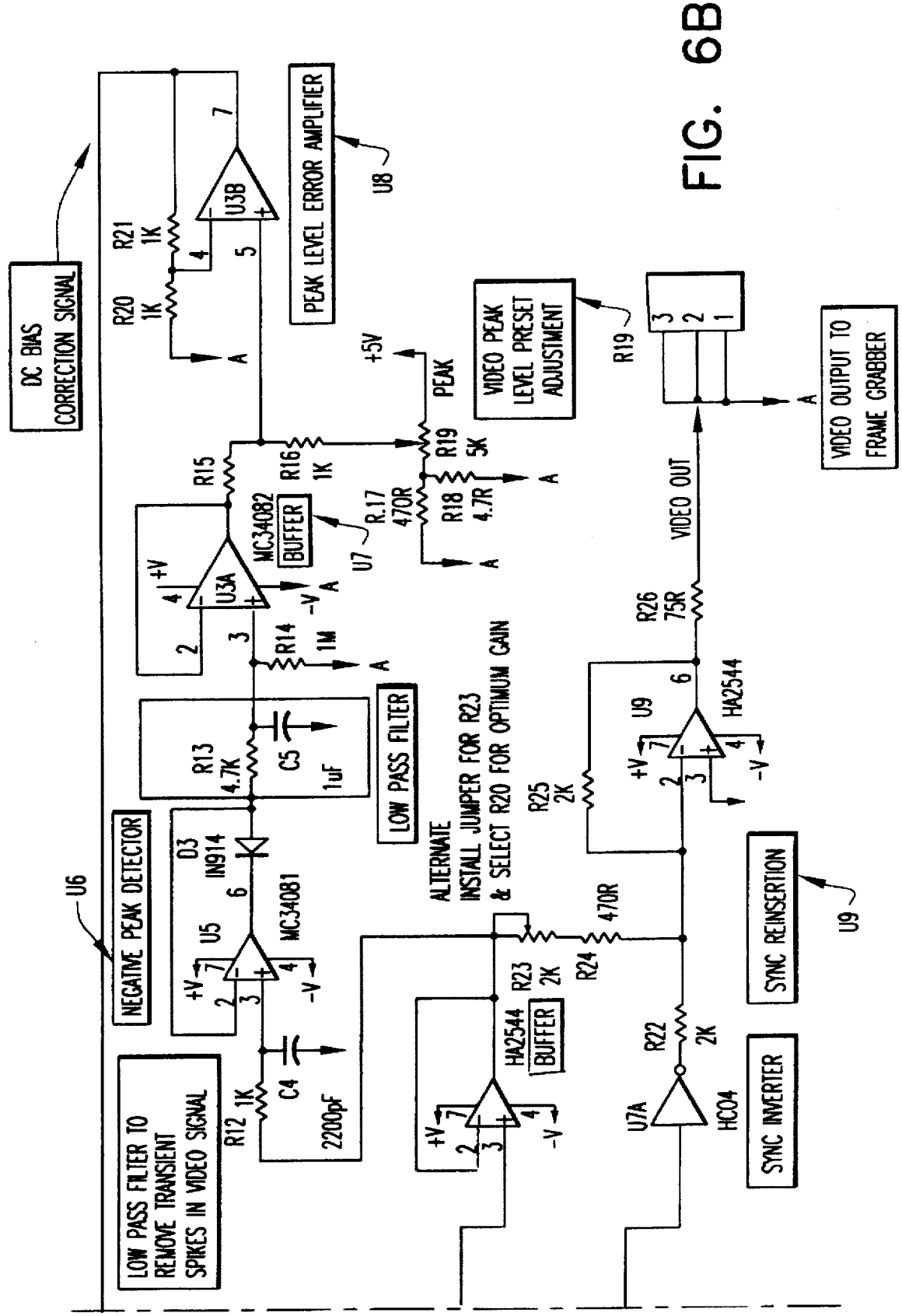

Referring now to FIG. 5, a block diagram of the contrast enhancement circuit is shown. Each block generally describes the functions being performed, and the block identifications are further identified in the schematic circuit drawing of FIG. 6. As shown in FIG. 5, the video input signal derived from the scanning is fed to an amplifier U1. The output of U1 is AC coupled via a capacitor C1, and then DC restored, using sync detector U2 and switch U4, so that the black level of the signal is clamped to zero volts. The DC restored signal is buffered by U3 and fed to inverting amplifier U5 that only passes signals that are positive with respect to zero volts. In this way, the analog video signal is amplified and separated from the composite horizontal and vertical sync pulses.

The output of U5 is in turn fed to a low pass filter, C4 and R12, to remove any artifacts in the image signal and prevent the subsequent peak detection circuit from responding to high frequency spurious signals (i.e., transient spikes from the pore bright spots and the halos, as previously described). The peak level of the filtered signal is then detected by U6, the response of the peak detector being determined by R 13, C5 and R 14 which together set the attack and decay rate of the peak detector so that the circuit adjusts at an optimum rate to changes in the input signal.

The detected peak signal is then buffered by U 7 and fed to amplifier U8 where it is compared with the desired DC level that is preset by potentiometer R 19. The error signal is fed back to U5 to close the feedback loop.

Inverting summing amplifier U9 is utilized to recombine the amplified and level corrected video signal with the composite horizontal and vertical sync pulses supplied by U 2. The output signal of U 9 is then passed to the frame grabber.

Figure 7:
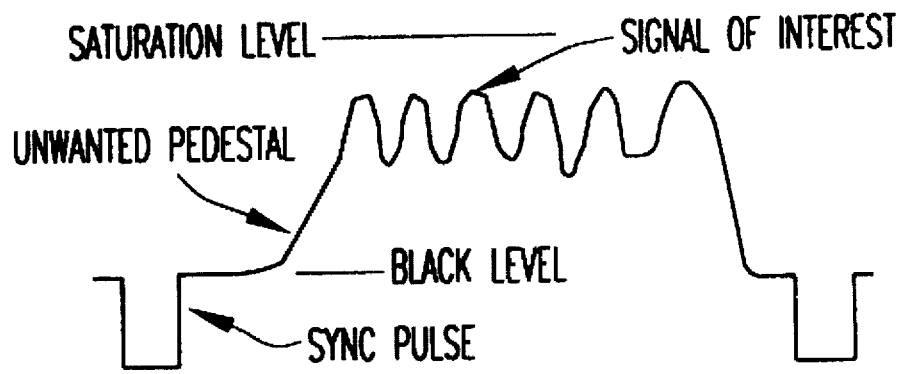
FIG. 7 illustrates a standard composite video signal output from the fingerprint scanner.
Figure 8:
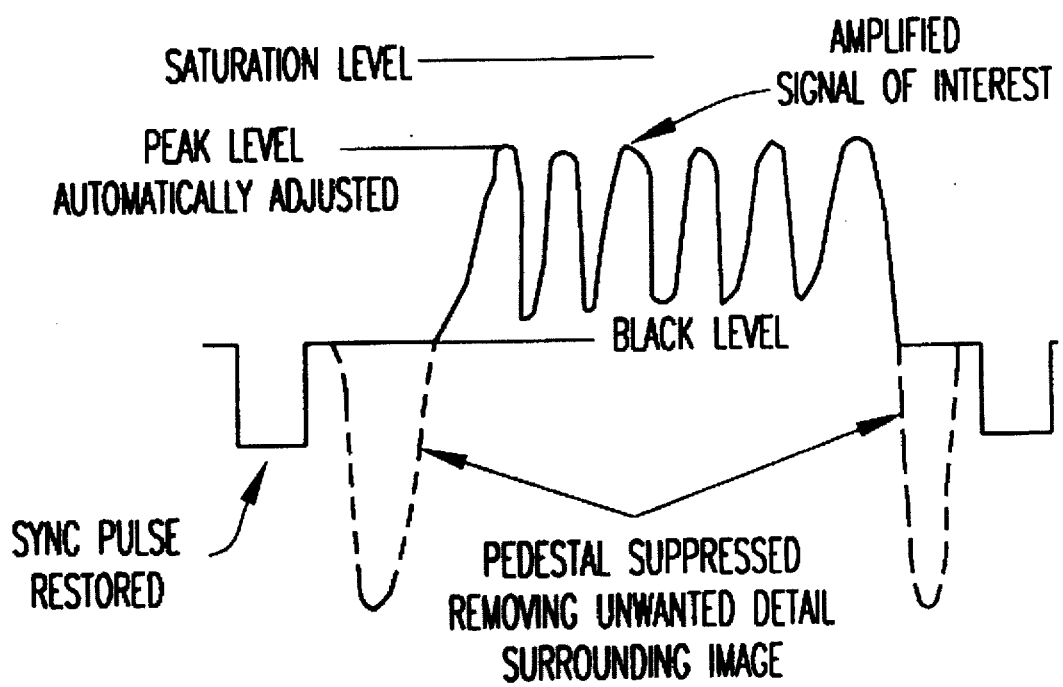
FIG. 8 illustrates the output of the contrast enhancement circuit representing the effect of the contrast enhancement circuit on the signal of FIG. 7.

The effect of the contrast enhancement circuit of the present invention can be seen in FIGS. 7 and 8. FIG. 7 represents a standard composite video signal output from the fingerprint scanner, and FIG. 8 illustrates the output of the contrast enhancement circuit. The enhancement circuit functions to amplify and automatically level adjust the signal of FIG. 7, to reduce the pedestal that the fingerprint signal of interest is riding on and to provide an optimum signal for subsequent analog to digital conversion. In FIG. 8 showing the output of the enhancement circuit, the ridge/valley fingerprint modulation has been amplified, and automatically level corrected. In the process, the unwanted image area surrounding the fingerprint image is suppressed to a saturated black level. The boundaries of the signal of interest accordingly are more easily detected during subsequent image processing, and a higher compression ratio is achievable if desired when compressing the image for storage and data transmission.

As will be evident from the above, a simple and inexpensive contrast enhancement circuit is provided, and which improves the reliability and robustness of the image with the numerous advantages described.

It will be appreciated by persons skilled in the act that variations and/or modifications may be made to the described embodiments of the present invention without departing from the spirit or scope of the invention.

What is claimed is:

1. An optical fingerprint imaging system comprising in combination:

a platen having a finger-touching surface to which a liquid layer may be applied;

means for providing two interrogating light beams, one on each side of and below the finger position on the platen and positioned to illuminate and provide a modulated light beam from the ridges and valleys of the finger surface when immersed in the liquid layer and placed on the finger-touching surface of the platen;

the two interrogating light beams each being collimated and the projections of each beam into a horizontal plane assuming an angle of approximately forty-five degrees with the longitudinal axis of the finger when place on the finger-touching surface;

imaging means;

a mirror for reflecting the visible modulated light beam from the finger ridges and valleys to the imaging means; and, a first polarizing filter positioned between the platen and the mirror to intercept the visible modulated light prior to reflection from the mirror.

2. The invention of claim 1, including a layer of liquid on the finger-touching surface of sufficient thickness to immerse the finger surface.

3. The invention of claim 1, wherein the imaging means comprises an imaging lens and a scanning array.

4. The invention of claim 1, including a second optical polarizing filter positioned above the finger-touching surface of the platen on the opposite side of the platen from the first optical polarizing filter, the second filter being rotated at a ninety-degree angle with respect to the alignment of the first filter.

5. The invention of claim 1, wherein the two collimated light beams are each incident to the finger-touching surface at an angle of approximately thirty degrees.

6. The invention of claim 1, wherein the platen has two side surfaces positioned below opposite sides of the finger-touching surface and on opposite sides of the finger-touching position, the said two side surfaces being angularly oriented normal to the two collimated light beams as they pass into the platen through said two side platen surfaces prior to interrogating the finger surface.

7. The invention of claim 1, including a light-emitting diode positioned below the platen and a photo transistor positioned above the platen to receive light from the diode, the diode and photo transistor being oriented with respect to the finger-touching surface such that the finger when placed on the finger-touching surface blocks the light from the light emitting diode from reaching the photo-transistor.

8. The invention of claim 1, including contrast enhancement electrical circuit means having as its input a video input signal derived from the scanning array, the circuit having means to increase the modulation of the scanned fingerprint signal and means to automatically adjust the level of the modulated signal whereby the circuit output signal is contrast enhanced without saturation, said circuit further having a peak detector and electrical filtering means to prevent the peak detector from responding to spurious signals.

9. The invention of claim 8, included circuit means to clamp the black level period of the input signal at zero volts.

10. The invention of claim 9, including circuit means providing a DC feedback bias correction signal derived from comparing the peak detector output signal with a preset required DC level.

11. A method of fingerprint imaging comprising immersing the finger in a layer of liquid on a finger-touching surface, the layer of liquid being of sufficient thickness to immerse the ridges and at least a portion of the valleys of the finger surface, interrogating the finger surface by two colliminated light beams from below and respectively on opposite sides of the finger surface, the horizontal projection of the collimated light beams assuming an angle of approximately forty-five degrees with the longitudinal axis of the finger when placed on the finger-touching surface, intercepting and optically filtering by a polarizing filter the modulated light reflected from the finger surface, and thereafter reflecting and scanning the modulated light.

12. The invention of claim 11, including optically filtering by a second polarizing filter the non-interrogating light above the finger prior to its reaching the finger.

13. The invention of claim 12, including aligning the two polarizing filters to block the non-interrogating light above the finger from being scanned.

14. A fingerprint imaging system comprising in combination:

a platen having a finger-touching surface to which a liquid layer may be applied;

means for providing two collimated interrogating light beams to illuminate and provide a modulated light beam from the ridges and valleys of a finger surface immersed in the liquid layer and placed on the finger-touching surface;

means to image the modulated light beam;

a circuit to enhance the contrast of the imaged light beam;

electrical and optical filtering means;

said contrast enhancement circuit including the electrical filter means to filter out spurious input signals;

said optical filtering means comprising a polarizing filter positioned on one side of the platen to intercept the modulated light beam prior to its being imaged.

15. The invention of claim 14, including a layer of liquid on the finger-touching surface of sufficient thickness to immerse the finger surface.

16. The invention of claim 15, having a second optical polarizing filter positioned above the finger-touching surface on the opposite side of the platen from the first optical polarizing filter, the second filer being rotated with respect to the alignment of the first optical filter whereby the two optical polarizing filters function to eliminate non-interrogating light from above the platen reaching the means to image the modulated light beam.

* * * * *